United States Patent [19]

Grothues-Spork

[11] Patent Number: 4,631,036
[45] Date of Patent: Dec. 23, 1986

[54] STERN FIN FOR SINGLE-PROP SHIP

[76] Inventor: Hermann Grothues-Spork, Heimat 61, D-1000 Berlin, Fed. Rep. of Germany

[21] Appl. No.: 628,016

[22] Filed: Jul. 5, 1984

[30] Foreign Application Priority Data

Jul. 6, 1983 [DE] Fed. Rep. of Germany ....... 3324753

[51] Int. Cl.$^4$ ............................................. B63H 1/18
[52] U.S. Cl. ...................................... 440/66; 114/57; 114/126
[58] Field of Search ............... 440/51, 66, 82; 114/57, 114/126, 140, 127, 278; 415/213 C, 212 A, 216, 217

[56] References Cited

U.S. PATENT DOCUMENTS 1,186,210  6/1916  Kitchen et al. ..................... 440/51

FOREIGN PATENT DOCUMENTS

| 1067527 | 6/1954 | France ........................ 440/66 |
| 1500013 | 11/1967 | France ........................ 440/66 |
| 252488 | 3/1927 | Italy .......................... 114/57 |
| 58-491 | 1/1983 | Japan ......................... 440/66 |
| 58-128994 | 8/1983 | Japan ......................... 440/66 |
| 81119 | 12/1952 | Norway ........................ 440/66 |
| 293351 | 6/1929 | United Kingdom ................ 440/66 |
| 878345 | 9/1961 | United Kingdom ................ 114/57 |

OTHER PUBLICATIONS

Article "Vibration Problem with a Class of Cargo Liner and the Solution from Fitting a Fin" (K. Takekuma, Transactions of the Royal Institution of Naval Architects, paper 18, 1979).

Primary Examiner—Galen L. Barefoot
Assistant Examiner—Thomas J. Brahan
Attorney, Agent, or Firm—Karl F. Ross; Herbert Dubno

[57] ABSTRACT

A ship has a stern provided with a propeller that rotates in a plane about a horizontal midline ship axis perpendicular to this plane to displace the ship horizontally forward and a plurality of fins secured to and extending horizontally from the stern ahead of the propeller in the ship displacement direction. Each such fin is curved and has relative to this direction a leading edge directed parallel and into the direction of boundary-layer flow at this leading edge and a trailing edge extending parallel to the axis. The leading edges of this invention are normally directed upward and the fins project horizontally from the stern by a distance at most equal to the thickness of the boundary-flow layer, also measured horizontally and perpendicular to the stern at the respective fin. The fins are arranged in vertical rows on each side of the stern ahead of the propeller. The rows can be identical, with the same vertical spacing and relative orientations of the fins, or different to accommodate different ship hydrodynamics.

15 Claims, 8 Drawing Figures

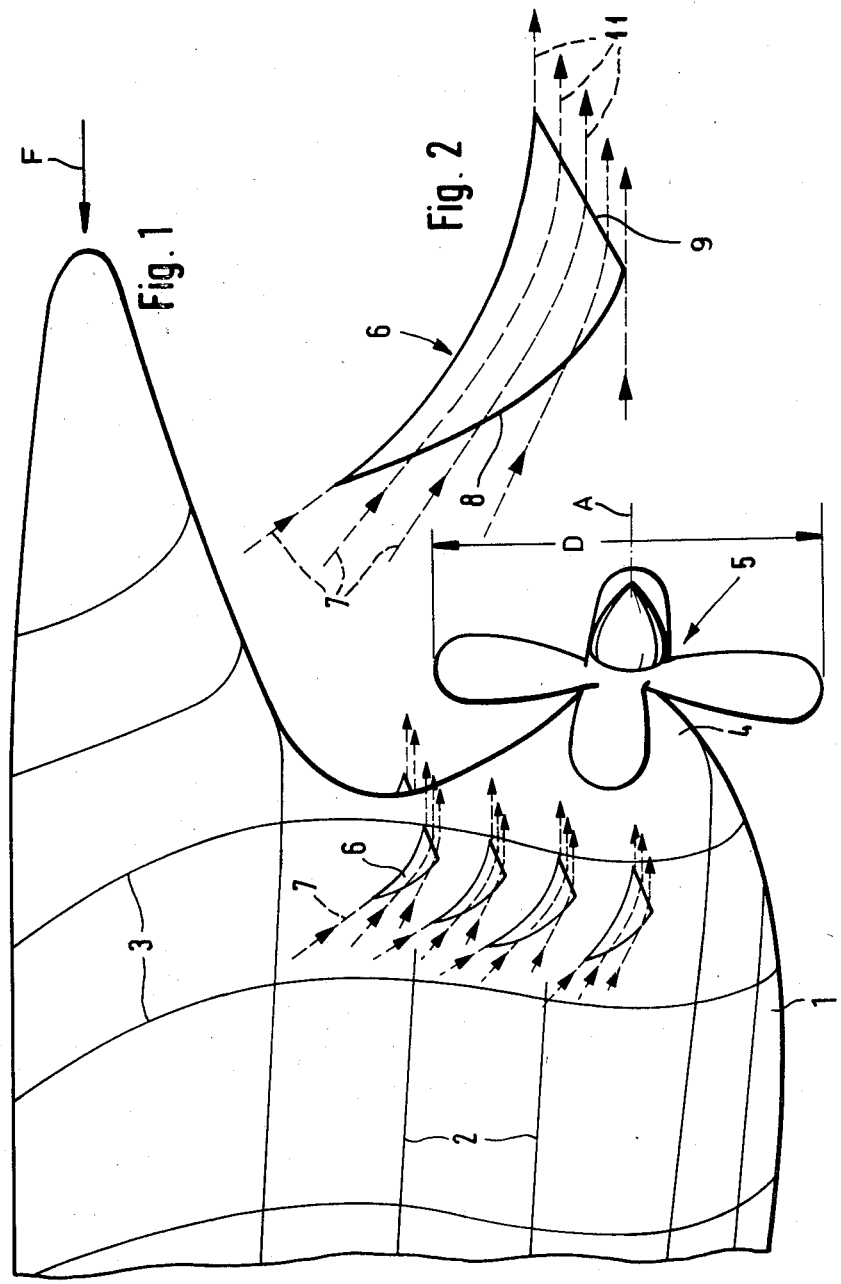

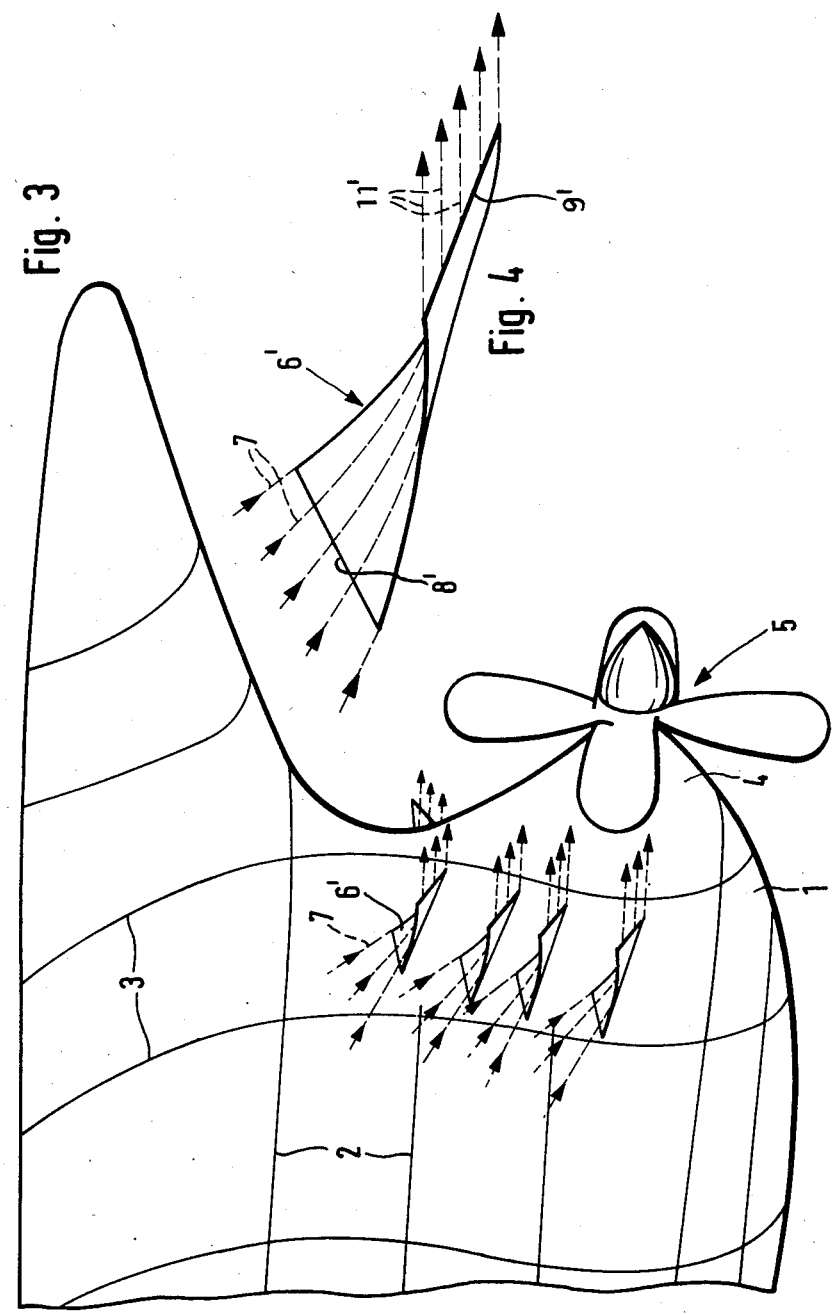

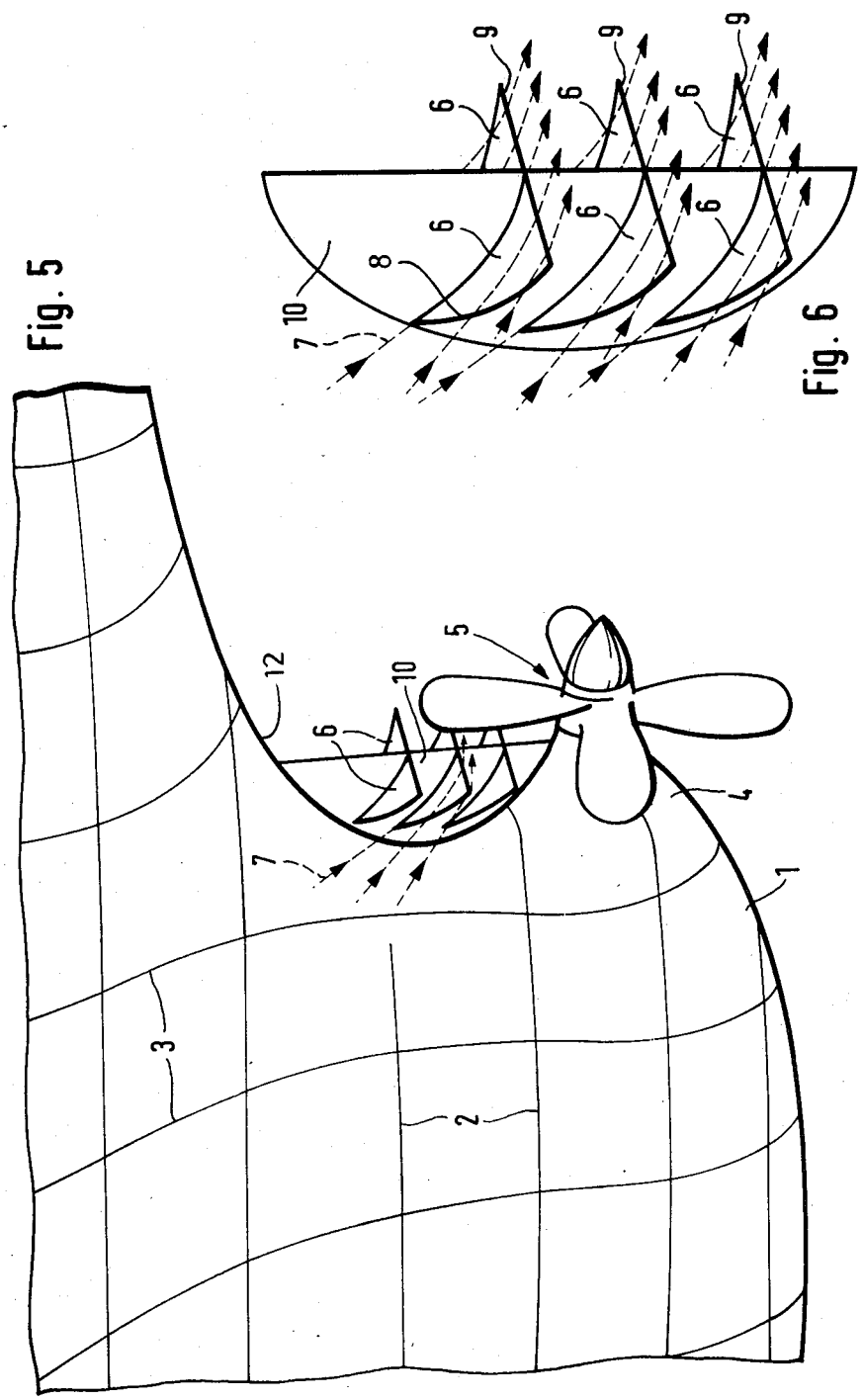

STERN FIN FOR SINGLE-PROP SHIP

FIELD OF THE INVENTION

The present invention relates to a single-prop wide-beam ship. More particularly this invention concerns a stern fin for increasing propeller performance of such a watercraft.

BACKGROUND OF THE INVENTION

Attempts are continuously being made to increase the efficiency of the propulsion of watergoing vessels. Hull and propeller design must be interdependently adjusted to reduce cavitation and the production of vibration. It is also necessary to make the water flow back through the propeller as uniform as possible so the rotation of the propeller is transformed efficiently into backwardly directed thrust. In general any decrease in cavitation, vibration, and turbulence results in increased propeller efficiency.

In particular "Vibration Problem With a Class of Cargo Liner and the Solution From Fitting a Fin" (K. Takekuma, *Transactions of the Royal Institution of Naval Architects*, paper 18, 1979) describes how a stern tunnel fin is fitted to a ship to reduce the drawing of bubbles down into the propeller vortex. Such a stern fin projects horizontally from both sides of the hull from locations immediately ahead of and above the propeller. Each such fin is of airfoil section and has a thin leading edge that is somewhat below its thicker trailing edge, relative of course to the normal forward direction of travel of the ship. The purpose of the fin is to deflect upward the bubbles drawn underwater by the ship's bow wake. Such a solution relates to a particular vibrational problem, and is indicative of the intensity of work in this field.

Nonetheless it is still true that the efficiency of a ship propulsion system can be improved upon.

OBJECTS OF THE INVENTION

It is therefore an object of the present invention to provide an improved fin for a single-prop ship drive.

SUMMARY OF THE INVENTION

A ship having a stern provided with a propeller that rotates in a plane about a horizontal midline ship axis perpendicular to this plane to displace the ship horizontally forward is provided according to the invention with a plurality of fins secured to and extending horizontally from the stern ahead of the propeller in the ship displacement direction. Each such fin is curved and has relative to this direction a leading edge directed parallel and into the direction of boundary-layer flow at this leading edge and a trailing edge extending parallel to the axis.

The instant invention is based on the recognition that modern-day ships of the full-body type having inwardly curved sides create considerable boundary-layer flow that moves downward over the ship body as same moves through the water. Immediately ahead of the propeller this boundary layer is moving mainly downward and can be some 2 m thick, measured perpendicular from the ship. Of this flow only the small horizontal component actually is effective when engaged by the propeller; the cross-flow is mainly ineffective. The fins according to this invention are capable of diverting this downward flow to backward flow, thereby directing it perpendicularly through the propeller and greatly increasing the effectiveness thereof. Such diversion creates a uniform propeller wake that itself gives very good thrust.

Tests have shown that such an arrangement gives extremely smooth operation. There is no appreciable generation of vibration and cavitation is wholly eliminated, mainly by deflecting the boundary-layer flow with no losses. When retrofitted to an existing vessel, the improvement in speed is measurable.

The leading edges of this invention are normally directed upward. The fins project horizontally from the stern by a distance at most equal to the thickness of the boundary-flow layer, also measured horizontally and perpendicular to the stern at the respective fin. Even with such stubby fins, at most about 2 m long as mentioned above, the improvement in propeller efficiency is marked.

The fins in accordance with the present invention are arranged in vertical rows on each side of the stern ahead of the propeller. The rows can be identical, with the same vertical spacing and relative orientations of the fins, or different to accommodate different ship hydrodynamics, in particular when boundary flow is different on the two sides of the ship due to different hull shapes or the like.

The fins furthermore are spaced forward of the propeller by a distance equal to at most twice the propeller diameter. They can be of uniform thickness and of part-cylindrical shape or of uniform thickness and each shaped as a warped plane. The leading edges each form an angle with the horizontal that decreases horizontally and perpendicularly away from the stern. The fins can also be of varying thickness.

Thus the fins of the present invention can be generally right triangular with the leading edge being the hypotenuse, in which case the plates are part-cylindrical, or they can be generally rectangular and the leading and trailing edges opposite each other, in which case the fins are shaped as warped planes.

Typically the trailing edges of the fins of this invention are straight and substantially parallel to the propeller plane as well as perpendicular to the stern at the location from which they extend.

In another arrangement according to this invention the ship has a rearwardly concave stern stem above the propeller and is provided above and immediately in front of the propeller with a plate extending vertically upward from the propeller axis and having starboard and port faces. The fins are fixed to the plate extending from the faces thereof.

DESCRIPTION OF THE DRAWING

The above and other features and advantages will become more readily apparent from the following, it being understood that any feature described with reference to only one embodiment of the invention can be used where possible with any other embodiment. In the accompanying drawing:

FIG. 1 is a perspective side view of a ship stern and propeller provided with fins according to this invention;

FIG. 2 is a large-scale perspective and partly diagrammatic view of the fin of FIG. 1;

FIGS. 3 and 4 are views like respective FIGS. 1 and 2 of another fin arrangement according to this invention;

FIGS. 5 and 6 are views like respective FIGS. 1 and 2 of yet another fin arrangement according to the invention.

SPECIFIC DESCRIPTION

Figure 8:
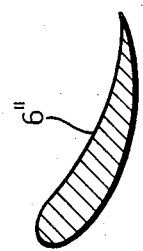
FIG. 8 is a cross section through another fin according to this invention.

As seen in FIGS. 1 and 2 a ship stern 1 according to this invention is of full shape as indicated by water lines 2 and rib lines 3, terminating at a stern-end propeller mount 4 carrying a propeller 5 of diameter D and rotatable about a midline axis A to drive the ship in the direction of arrow F. Such propulsion causes a boundary layer of water at most about 2 m thick to flow down and back along the ship as indicated by arrows 7. In normal prior-art hulls this flow therefore passes obliquely through the propeller and does not allow same to operate with full efficiency.

According to this invention laterally projecting stern fins 6 are provided having leading edges 8 and trailing edges 9. These fins 6 are curved, here right triangles of part-cylindrical contour, so that they extend parallel to the laminar flow directions 7, which form increasingly acute angles with the horizontal outward away from the hull 1, whereas the trailing edges 9 extend perpendicular to the hull and the plate at these edges 9 is parallel to flow directions 11 parellel to the axis A and, therefore, perpendicular to the propeller plane. Such deflection of the boundary flow from direction 7 to direction 11 takes place without effective losses, and greatly increases propeller efficiency by directing flow perpendicularly through it.

In FIGS. 1 and 2 the fins 6 are formed of uniform-thickness steel plate, right-triangular in shape and part-cylindrical, that is with surfaces formed by families of parallel lines equidistant from a common line parallel thereto. This type of construction, with the rear edge 9 perfectly perpendicular to the location on the hull it extends from and the hypotenuse of the right triangle forming the leading edge 8, causes the angle formed at the leading edge with respect to the horizontal or direction F to become increasingly acute away from the hull 1. This exactly follows the direction of flow of the boundary water so that at its leading edge each curved fin 6 is tangent to the actual boundary-layer flow, whereas at its trailing edge each curved fin 6 is tangent to the desired flow direction, that is perpendicular to the propeller plane.

In the arrangement of FIGS. 3 and 4, where the same references are used for the same structure as in FIGS. 1 and 2, the fins 6' are formed from steel plates of rectangular shape, and the leading and trailing edges are opposite each other. These fins 6' are formed as multiply warped planes, that is they are bent such that different portions have different centers and/or radii of curvature.

Figure 7:
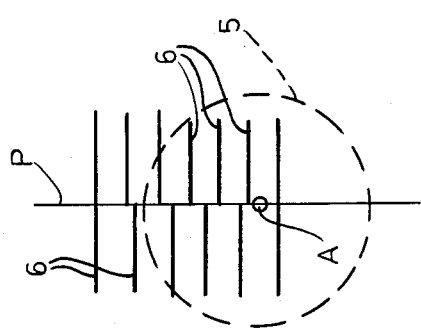
FIG. 7 is a small-scale rear end in mainly diagrammatic form illustrating a ship stern according to this invention.

FIG. 7 illustrates how the row of fins 6 to one side of the midship plane P is different from the row on the opposite side, being more numerous, to counterbalance local flow characteristics. FIG. 8 shows how a fin 6" can be of airfoil section, that is of varying thickness.

FIGS. 5 and 6 show how the stern stem 12 of the hull 1 is backwardly concave above the propeller 5 and is provided with a plate 10 at the midship plane. Fins 6 identical to those of FIG. 1 are secured to this plate 10, making this installation extremely convenient for retrofitting a ship. Another such plate can be provided below the propeller 5. Such an arrangement could also be used with a propeller ring, that is a tube fixed on the hull and surrounding the propeller.

I claim:

1. In combination with a ship having a stern provided with a propeller that rotates in a plane and about a horizontal midline ship axis perpendicular to this plane to displace the ship horizontally forward and form a downward and rearward boundary-layer flow, a plurality of fins secured to and extending horizontally from the stern ahead of the propeller in the ship displacement direction, each such fin being curved and having relative to this direction a swept-back leading edge directed parallel and into the direction of boundary-layer flow at this leading edge and a trailing edge extending parallel to the axis, the fins projecting horizontally from the stern and perpendicular thereto at the respective fin by a distance at most equal to the thickness of the boundary-flow layer.

2. The combination defined in claim 1 wherein the leading edges are directed upward.

3. The combination defined in claim 1 wherein the fins are arranged in vertical rows on each side of the stern ahead of the propeller.

4. The combination defined in claim 3 wherein the rows are identical.

5. The combination defined in claim 3 wherein the rows are different.

6. The combination defined in claim 1 wherein the fins are spaced forward of the propeller by a distance equal to at most twice the propeller diameter.

7. The combination defined in claim 1 wherein the fins are of uniform thickness and of part-cylindrical shape.

8. The combination defined in claim 1 wherein the fins are of uniform thickness and are each shaped as a warped plane, the fins each forming at the respective leading edges an angle with the horizontal that decreases horizontally and perpendicularly away from the stern and that is open away from the ship.

9. The combination defined in claim 1 wherein the fins are of varying thickness.

10. The combination defined in claim 1 wherein the trailing edges are straight and substantially parallel to the propeller plane.

11. The combination defined in claim 10 wherein the trailing edges are perpendicular to the stern at the location from which they extend.

12. The combination defined in claim 1 wherein the ship has a rearwardly concave stern stem above the propeller and is provided above and immediately in front of the propeller with a plate extending vertically upward from the propeller axis and having starboard and port faces, the fins being fixed to the plate extending from the faces thereof.

13. The combination defined in claim 1 wherein the fins are generally right triangular with the leading edge being the hypotenuse.

14. The combination defined in claim 13 wherein the fins are part-cylindrical.

15. The combination defined in claim 3 wherein the fins are generally rectangular and shaped as warped planes.

* * * * *